United States Patent
He

(10) Patent No.: US 8,767,140 B2
(45) Date of Patent: Jul. 1, 2014

(54) BACKLIGHT MODULE

(75) Inventor: Yongxin He, Beijing (CN)

(73) Assignees: Boe Technology Group Co., Ltd., Beijing (CN); Hefei Xinsheng Optoelectronics Technology Co., Ltd., Hefei, Anhui Province (CN)

( * ) Notice: Subject to any disclaimer, the term of this patent is extended or adjusted under 35 U.S.C. 154(b) by 101 days.

(21) Appl. No.: 13/165,335

(22) Filed: Jun. 21, 2011

(65) Prior Publication Data

US 2011/0310327 A1    Dec. 22, 2011

(30) Foreign Application Priority Data

Jun. 22, 2010  (CN) ...................... 2010 2 0246454 U

(51) Int. Cl.
*G02F 1/1333* (2006.01)
*F21V 7/04* (2006.01)

(52) U.S. Cl.
USPC .............................. 349/58; 349/161; 362/634

(58) Field of Classification Search
USPC ..................... 349/58, 161, 65, 62, 61, 69, 67; 362/634, 632, 606, 613, 612, 611
See application file for complete search history.

(56) References Cited

U.S. PATENT DOCUMENTS

| | | | | |
|---|---|---|---|---|
| 5,365,411 A * | 11/1994 | Rycroft et al. | ................... | 362/20 |
| 5,546,203 A * | 8/1996 | Takao | .............. | 349/62 |
| 7,322,734 B2 * | 1/2008 | Shai et al. | ..................... | 362/633 |
| 7,591,578 B2 * | 9/2009 | Chang | .......................... | 362/612 |
| 7,611,274 B2 * | 11/2009 | Hsiao et al. | ..................... | 362/634 |
| 8,092,038 B2 * | 1/2012 | Liao et al. | ................. | 362/217.1 |
| 2007/0171676 A1* | 7/2007 | Chang | ......................... | 362/613 |
| 2008/0055534 A1* | 3/2008 | Kawano | ........................ | 349/161 |
| 2010/0165239 A1* | 7/2010 | Lee et al. | ........................ | 349/58 |
| 2011/0025942 A1* | 2/2011 | Lee | ................. | 349/58 |

* cited by examiner

*Primary Examiner* — Edward Glick
*Assistant Examiner* — Mark Teets
(74) *Attorney, Agent, or Firm* — Ladas & Parry LLP

(57) ABSTRACT

An embodiment of the invention provides a backlight module, comprising: a metal rear plate, comprising a bottom plate, a side edge structure and a bended structure; a light strip structure including a circuit substrate and a light source disposed on the circuit substrate; and an outer frame, wherein, the bended structure is provided with a first protruding structure extending toward the light strip structure, the bottom plate is provided with a second protruding structure extending toward the light strip structure, the circuit substrate of the light strip structure is fixed on the side edge structure by the first and second protruding structures, the side edge structure is provided with a first opening aligned with to the light source, the outer frame is provided with a second opening corresponding to the first opening.

17 Claims, 2 Drawing Sheets

BACKLIGHT MODULE

BACKGROUND

An embodiment of the present invention relates to a backlight module.

A liquid crystal display, which generally includes a liquid crystal panel and a backlight module, is a flat panel display that has been commonly used. The backlight module is an important component for supplying the liquid crystal panel with light in the liquid crystal display.

FIG. 4 is a diagram showing a structure of a backlight module. As shown in FIG. 4, the backlight module includes a reflective plate 25, a light guide plate 24, an optical sheet 23, a light source 26, a circuit substrate 27, a metal rear plate 21, and an outer frame 22. The light guide plate 24 is located above the reflective plate 25, the optical sheet 23 is located above the light guide plate 24, the light source 26 is disposed on the circuit substrate 27, the light source 26 and the circuit substrate 27 are disposed within a chamber 29 surrounded by the metal rear plate 21 and the light guide plate 24, the light source 26 and the circuit substrate 27 are disposed on a side of the light guide plate 24, the circuit substrate 27 is fixed on the metal rear plate 21 by a heat dissipation glue 18, and the outer frame 22 is mounted on the metal rear plate 21.

When the light source 26 is turned on, a large amount of heat will be generated. The generated heat is transferred to the metal rear plate 21 via the circuit substrate 27 and the heat dissipation glue 18, and then transferred to the outside of the backlight module by the metal rear plate 21. As the liquid crystal display has been becoming larger, higher luminance of the light source is required, and it has to use a light source with higher power or more light sources for the backlight module to meet the requirement of the liquid crystal display. However, the light source with higher power or more light sources will generate much heat. The structure and the heat dissipation mode of the above backlight module can not meet the requirement for heat dissipation of the large-size liquid crystal display. With regard to the large-size liquid crystal display, the heat dissipation efficiency of the backlight module is low, so that the heat is accumulated in the backlight module. As a result, the light source is damaged and the life span of the backlight module is reduced.

SUMMARY

An embodiment of the invention provides a backlight module, comprising: a metal rear plate, comprising a bottom plate extending horizontally, a side edge structure erected at the periphery of the bottom plate, and a bended structure extending horizontally and connected to the side edge structure; a light guide plate, located above the bottom plate, and side edges of the light guide plate being surrounded by the bottom plate, the side edge structure, and the bended structure of the metal rear plate; an optical sheet, located above the light guide plate; a light strip structure, disposed at the inner side of the side edge structure of the metal rear plate and located at a side of light guide plate, and including a circuit substrate and a light source disposed on the circuit substrate; and an outer frame, mounted on the outer side of the metal rear plate so as to surround side edges of the metal rear plate, wherein, the bended structure is provided with a first protruding structure extending toward the light strip structure, the bottom plate is provided with a second protruding structure extending toward the light strip structure, the circuit substrate of the light strip structure is fixed on the side edge structure by the first and second protruding structures, the side edge structure is provided with a first opening corresponding to the light source, the outer frame is provided with a second opening corresponding to the first opening.

Another embodiment of the invention provides a liquid crystal display comprising the backlight module mentioned above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Embodiments of the invention now will be described more clearly and fully hereinafter with reference to the accompanying drawings, in which the embodiments of the invention are shown. Apparently, only some embodiments of the present invention, but not all of embodiments, are set forth here, and the present invention may be embodied in other forms. All of other embodiments made by those skilled in the art based on embodiments disclosed herein without mental work fall within the scope of the present invention.

Figure 1:
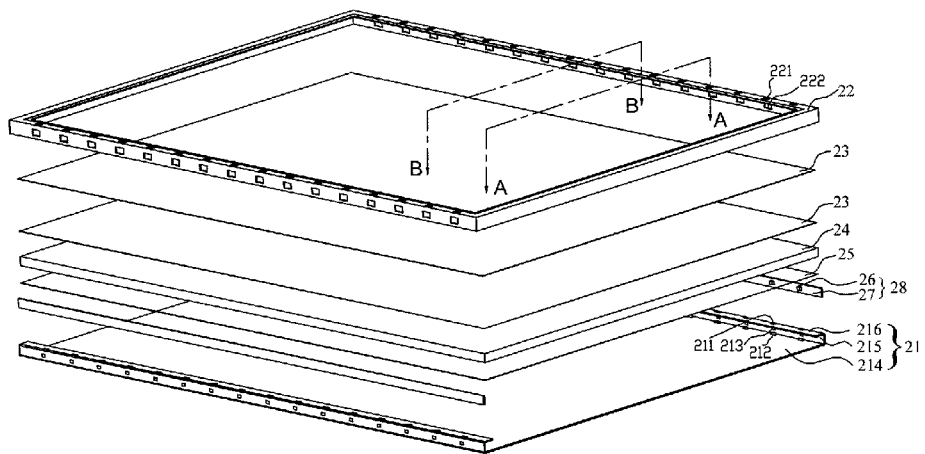
FIG. 1 is a diagram showing a structure of a backlight module according to an embodiment of the invention.
Figure 2:
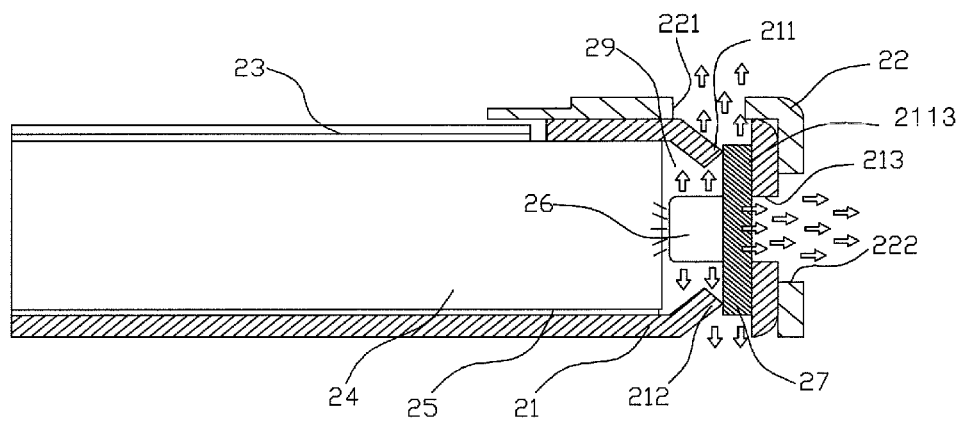
FIG. 2 is a sectional view taken along a line A-A in FIG. 1.
Figure 3:
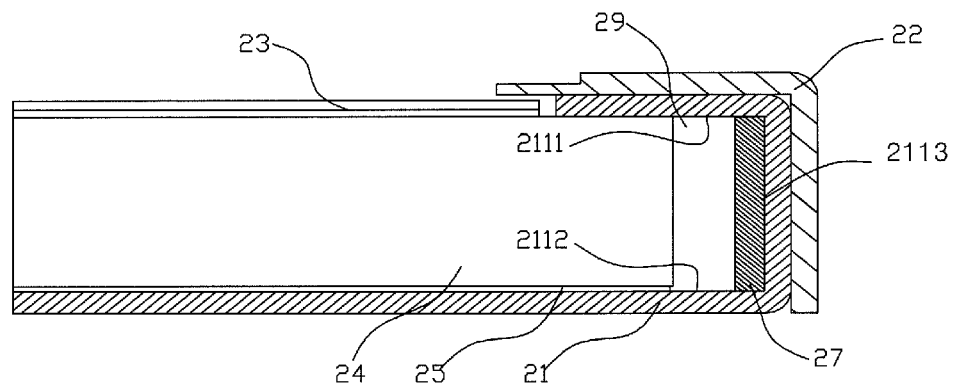
FIG. 3 is a sectional view taken along a line B-B in FIG. 1.
Figure 4:
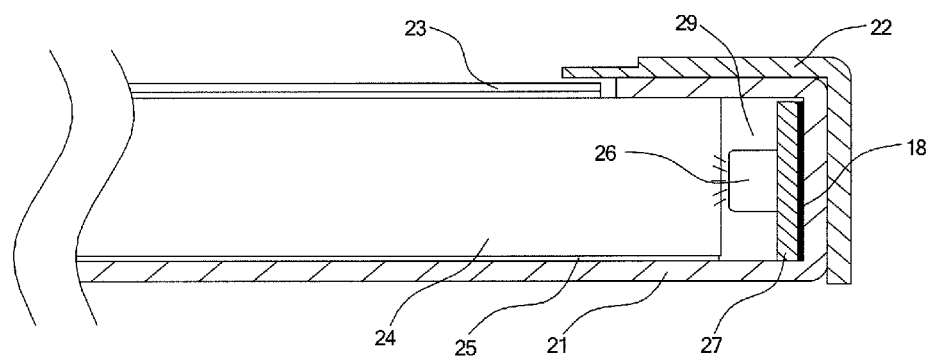
FIG. 4 is a diagram showing a structure of a backlight module.

FIG. 1 is a diagram showing a structure of a backlight module according to an embodiment of the invention, FIG. 2 is a sectional view taken along a line A-A in FIG. 1, and FIG. 3 is a sectional view taken along a line B-B in FIG. 1. As shown in FIGS. 1-3, the backlight module comprises: a metal rear plate 21, a reflective plate 25, a light guide plate 24, an optical sheet 23, a light strip structure 28, and an outer frame 22. The metal rear plate 21 comprises a bottom plate 214 extending horizontally, a side edge structure 215 erected at the periphery of the bottom plate 214, and a bended structure 216 extending horizontally and connected to the side edge structure 215. The respective portions of the metal rear plate 21 may be formed from a single plate, or may be formed from different plates respectively and then be combined together. Hole or Holes for heat dissipation may be formed at a portion of the bottom plate 214, for example, at a portion near to the center of the bottom plate 214. The reflective plate 25 is located above the bottom plate 214. In one embodiment, the top surface of the bottom plate 214 is formed into a reflective surface and the reflective plate 25 may be omitted. The light guide plate 24 is located above the reflective plate 25, and the side edges of the light guide plate 24 are surrounded by the bottom plate 214, the side edge structure 215, and the bended structure 216 of the metal rear plate 21. The optical sheet 23 is located above the light guide plate 24. The light guide plate 24 and the optical sheet 23 may be formed of resin material, and may be formed with suitable patterns on the surfaces thereof. The light strip structure 28 is in a long strip shape, and is disposed at the inner side of the side edge structure 215 of the metal rear plate 21 and is located at a side of the light guide plate 24. The outer frame 22 is mounted on the outer side of the metal rear plate 21 so as to surround the side edges of the metal rear plate 21. The outer frame 22 may be formed of metal material or plastic material. The light strip structure 28 comprises a circuit substrate 27 in a long strip shape and at least one light source 26 disposed on the circuit substrate 27. The bended structure 216 of the metal rear plate 21 is provided with a first protruding structure 211, which extends toward the inner side (i.e., the side where the light guide plate 24 and the light strip structure 28 are located), along the side edges of the rear plate 21. The bottom plate 214 is provided with a second protruding structure 212, which extends toward the inner side (i.e., the side where the light guide plate 24 and the light strip structure 28 are located) and corresponds to the first protruding structures 211, along the side edges of the rear plate 21. The circuit substrate 27 is snap-fitted on and apposed to the side edge structure 215 by the first and second protruding structures 211 and 212. The side edge structure 215 is formed with at least one first hole 213 corresponding to the light source 26 on the light strip structure 28. The outer frame is formed with second holes 222 each of which corresponds to each first hole 213.

In the present embodiment, the light strip structure 28 is disposed at the side of the light guide plate 24 and the light source 26 faces the side of the light guide plate 24; thus, the light emitted from the light source 26 entrances into the light guide plate through the side of the light guide plate 24. Therefore, a side light source is employed in the backlight module of the present embodiment. The light incident into the light guide plate 24 is reflected by the reflective plate 25 and emitted from the top surface of the light guide plate, then supplied to the liquid crystal panel disposed over the backlight module. The light guide plate 24 transforms the light source 26 which is a point light source into a plane light source which is required by the liquid crystal display.

There may be a plurality of light strip structures 28, and each of them may comprise a plurality of light sources 26 being juxtaposed. The light sources 26 are disposed on the circuit substrate 27 and emit light when being electrically conducted with the circuit substrate 27 via a circuit.

In the present embodiment, there may be a plurality of first protruding structures 211 and a plurality of second protruding structures 212, and the first protruding structures 211 and the second protruding structures 212 correspond to each other one by one (i.e., it is a one to one correspondence between the first protruding structures 211 and the second protruding structures 212). The first protruding structures 211 correspond to the light sources 26, and the second protruding structures 212 also correspond to the light sources 26. That is to say, as shown in FIG. 1, one first protruding structure 211 and one second protruding structure 212 correspond to one light source 26. The light source 26 is located inside a chamber 29 surrounded by the first protruding structure 211, the second protruding structure 212, the light guide plate 24, and the circuit substrate 27. In the present embodiment, the first and second protruding structures 211 and 212 may be formed by die stamping.

In the present embodiment, the circuit substrate 27 is fixed on the side edge structure 215 by the first and second protruding structures 211 and 212, so that the light strip structure 28 is fixed on the side edge structure 215. In the embodiment, the smallest distance between the first protruding structure 211 and the inner surface 2113 of the side edge structure 215 is equal to the thickness of the circuit substrate 27, and/or the smallest distance between the second protruding structure 212 and the inner surface 2113 of the side edge structure 215 is equal to the thickness of the circuit substrate 27. Thus, the circuit substrate 27 can be firmly fixed on the side edge structure 215 by the first and second protruding structures 211 and 212. In FIG. 2, openings are formed in the bended structure 216 and the bottom plate 214, respectively, while forming the first and second protruding structures 211 and 212. However, it is also possible that such openings are not formed.

In the present embodiment, as shown in FIG. 3, in addition to forming the first and second protruding structures 211 and 212, the inner surface 2111 of the bended structure 216 is parallel to the inner surface 2112 of the bottom plate 214, and the distance between the inner surface 2111 of the bended structure 216 and the inner surface 2112 of the bottom plate 214 is equal to the height of the circuit substrate 27.

Preferably, the sectional shape of the first opening 213 is of a square or a circle, and the sectional shape of the second opening 222 is also of a square or a circle. In practice, the sectional shapes of the first and second openings 213 and 222 may also be other shapes, which are not listed herein. Preferably, the width of the second opening 222 is larger than that of the first opening 213. In the present embodiment, a heat dissipation channel for the light source 26 is formed by the first and second openings 213 and 222. The heat generated by the light source 26 may be dissipated into the outside of the backlight module via the first and second openings 213 and 222.

Moreover, the outer frame 22 is formed with a third opening 221 corresponding to the first protruding structure 211. In the embodiment, there may be a plurality of third openings 221, and each of them corresponds to one first protruding structure 211. The sectional shape of the third opening 221 is of a square or a circle. In practice, the sectional shape of the third opening 221 may also be other shapes, which are not listed herein. In the embodiment, another dissipation channel is formed by the third opening 221. The heat generated by the light source 26 may be transferred to the third opening 221 through the first protruding structure 211 and/or the circuit substrate 27, and then dissipated into the outside of the backlight module through the third opening 221.

As shown in FIG. 1, in the embodiment, the light strip structure 28 may be directly inserted between the bended structure 216 and the bottom plate 214, and then be fixed on the side edge structure 215 by the first and second protruding structures 211 and 212.

In the embodiment of the present invention, the light source 26 used in the backlight module may be a LED light source.

In the backlight module according to the embodiment of the invention, the metal rear plate comprises a bottom plate, a side edge structure, and a bended structure, wherein the bended structure is provided with a first protruding structure, while the bottom plate is provided with a second protruding structure corresponding to the first protruding structure. The side edge structure is formed with a first opening corresponding to a light source, and an outer frame is formed with a second opening corresponding to the first opening. Thereby, the heat generated by the light source in the embodiment may be dissipated into the outside of the backlight module through the first and second openings, which improves the heat dissipation efficiency of the backlight module and thus the damage to the light source and the reduced lift span of the backlight module due to the heat accumulated in the backlight module can be avoided. In the embodiment, a light strip structure may be fixed on the side edge structure of the metal rear plate by the first and second protruding structures without using the heat dissipation glue, so the production cost is reduced. With the structure of the metal rear plate according to the embodiment, the light strip structure can be easily extracted from and inserted into the metal rear plate freely, so that it becomes easier to assemble and repair the light strip structure, and the operating efficiency is improved and the cost is reduced.

In one example, the outer frame may be provided with a third opening corresponding to the first protruding structure. The heat generated by the light source may be transferred to the third opening through the first protruding structure 211 and/or the circuit substrate, and then dissipated into the outside of the backlight module through the third opening. Thus, the heat dissipation efficiency of the backlight module is further enhanced, and the damage to the light source and the reduced lift span of the backlight module due to the heat accumulated in the backlight module can be further avoided.

In another example of the invention, the first protruding structures 211 correspond to the light sources 26 on the light strip structure 28, but the second protruding structures 212 and the first protruding structures 211 are not in one to one correspondence. For example, two first protruding structures 211 may correspond to one second protruding structure 212, as long as the light strip structure 28 can be fixed on the side edge structure 215. The first opening 213 in the rear plate 21 and the second opening 222 in the outer frame 22 form a heat dissipation channel for the light source 26, and thus the heat generated by the light source 26 can be dissipated to the outside of the backlight module via the first and second openings 213 and 222.

Another embodiment of the invention provides a liquid crystal display, which comprises a liquid crystal panel (not shown) and any one of the backlight modules described above. The liquid crystal panel is disposed above the backlight module, and the backlight module supplies the liquid crystal panel with light for displaying. The liquid crystal panel may be of various types, for example, TFT-LCD liquid crystal panel including vertical electric field type or horizontal electric field type.

It should be noted that: the above embodiments only have a purpose of illustrating the present invention, but not limiting it. Although the present invention has been described with reference to the above embodiment, those skilled in the art should understand that modifications or alternations can be made to the solution or the technical feature in the described embodiments without departing from the spirit and scope of the invention.

What is claimed is:

1. A backlight module, comprising:
a metal rear plate, comprising a bottom plate extending horizontally, a side edge structure erected at the periphery of the bottom plate, and a bended structure extending horizontally and connected to the side edge structure, bottom plate, the side edge structure and bended structure being formed of a single piece;
a light guide plate, located above the bottom plate, and side edges of the light guide plate being surrounded by the bottom plate, the side edge structure, and the bended structure of the metal rear plate;
an optical sheet, located above the light guide plate;
a light strip structure, disposed at the inner side of the side edge structure of the metal rear plate and located at a side of light guide plate, and including a circuit substrate and a light source disposed on the circuit substrate; and
an outer frame, mounted on the outer side of the metal rear plate so as to surround side edges of the metal rear plate,
wherein, the bended structure is provided with a first protruding structure extending toward the light strip structure to a level higher than the top of the light source in a vertical direction that is perpendicular to the bottom plate, the bottom plate is provided with a second protruding structure extending toward the light strip structure to a level lower than the bottom of the light source in the vertical direction, the circuit substrate of the light strip structure is fixed on the side edge structure by the first and second protruding structures, the side edge structure is provided with a first opening aligned with the light source, and the outer frame is provided with a second opening corresponding to the first opening.

2. The backlight module of claim 1, comprising a plurality of first protruding structures, a plurality of light sources, and the plurality of first protruding structures and the plurality of light sources correspond to each other one by one.

3. The backlight module of claim 2, comprising a plurality of second protruding structures, the plurality of first protruding structures and the plurality of second protruding structures correspond to each other one by one.

4. The backlight module of claim 1, comprising a plurality of first protruding structures and a plurality of second protruding structures, and the plurality of first protruding structures and the plurality of second protruding structures correspond to each other one by one.

5. The backlight module of claim 1, wherein the smallest distance between the first protruding structure and the inner side surface of the side edge structure is equal to the thickness of the circuit substrate, and the smallest distance between the second protruding structure and the inner surface of the side edge structure is equal to the thickness of the circuit substrate.

6. The backlight module of claim 1, wherein the inner surface of the bended structure is parallel to the inner surface of the bottom plate, and the distance between the inner surface of the bended structure and the inner surface of the bottom plate is equal to the height of the circuit substrate.

7. The backlight module of claim 1, wherein the sectional shape of the first opening is of a square or a circle.

8. The backlight module of claim 1, wherein the sectional shape of the second opening is of a square or a circle.

9. The backlight module of claim 7, wherein the sectional shape of the second opening is of a square or a circle.

10. The backlight module of claim 1, wherein the width of the second opening is larger than that of the first opening.

11. The backlight module of claim 1, wherein the bended structure is formed with an opening at each of the first protruding structure.

12. The backlight module of claim 1, wherein the outer frame is provided with a third opening corresponding to the first protruding structure.

13. The backlight module of claim 12, wherein the sectional shape of the third opening is of a square or a circle.

14. The backlight module of claim 11, wherein the outer frame is provided with a third opening corresponding to the first protruding structure.

15. The backlight module of claim 1, wherein the light source comprises a light emitting diode light source.

16. The backlight module of claim 1, further comprising:
a reflective plate, disposed above the bottom plate of the metal rear plate,
wherein the light guide plate is disposed above the reflective plate.

17. A liquid crystal display, comprising:
a liquid crystal panel; and
a backlight module of claim 1, disposed at the rear side of the liquid crystal panel to supply the liquid crystal panel with light for displaying.

* * * * *